United States Patent [19]

Guscott

[11] 4,258,255

[45] Mar. 24, 1981

[54] INFRARED INTRUSION DETECTION SYSTEM

[75] Inventor: John K. Guscott, Lynnfield, Mass.

[73] Assignee: American District Telegraph Company, New York, N.Y.

[21] Appl. No.: 32,337

[22] Filed: Apr. 23, 1979

[51] Int. Cl.³ .............................................. G01D 21/04

[52] U.S. Cl. .................................... 250/221; 250/342; 250/353; 350/299

[58] Field of Search ........................ 250/221, 342, 353; 350/299

[56] References Cited

U.S. PATENT DOCUMENTS 3,958,118 5/1976 Schwarz .............................. 250/221

*Primary Examiner*—David C. Nelms

*Assistant Examiner*—Darwin R. Hostetter

*Attorney, Agent, or Firm*—Weingarten, Maxham & Schurgin

[57] ABSTRACT

A passive infrared intrusion detection system including a mirror assembly having an array of plane mirrors disposed at respective angular positions to provide a wide field of view. A parabolic mirror confronts the plane mirror array and is disposed with an infrared detecting element at its focal point. Radiation received in the field of view is directed by one or more of the plane mirrors to the parabolic mirror which focuses the received radiation onto the detecting element which provides an electrical signal which is processed to provide an alarm indication of intruder presence.

11 Claims, 6 Drawing Figures

INFRARED INTRUSION DETECTION SYSTEM

FIELD OF THE INVENTION

This invention relates to intrusion detection systems and more particularly to a passive infrared system for detection of an intruder within a protected space.

BACKGROUND OF THE INVENTION

In a passive infrared intrusion detection system, infrared radiation in a space to be protected is sensed to produce an electrical signal which represents the level of received radiation in the protected area. The presence of an intruder in the protected area gives rise to an increase in the radiation level which is sensed to provide an output indication of intruder presence when the level of received radiation exceeds a predetermined threshold level. Examples of passive infrared intrusion detection systems are shown in U.S. Pat. Nos. 3,036,219; 3,524,180; 3,631,434; 3,703,718 and 3,886,360.

SUMMARY OF THE INVENTION

In accordance with the present invention, a passive infrared intrusion detection system is provided which is of relatively low cost and of compact construction and which includes a mirror assembly having a wide field of view to direct radiation in the viewing field to a detector element. The mirror assembly comprises an array of plane mirrors disposed at respective angular positions to provide a wide receiving field of view. A parabolic mirror confronts the plane mirror array and is disposed with a detector element at the focal point. The angular orientation of the plane mirrors in relation to the parabolic mirror is such that radiation in the field of view is received by one or more of the plane mirrors and directed, along an axis parallel to the parabolic mirror axis, to the parabolic mirror which focuses the radiation onto the detector element. This element produces an electrical signal representative of the magnitude of received radiation and this signal is processed to produce an alarm indication when the signal exceeds a predetermined threshold level or otherwise meets the detection criteria which has been established. The plane mirror array is preferably formed as an integral unit, such as by plastic molding, which is mounted on a housing and includes means for adjusting the angular disposition of the array to adjust the field of view for the particular space to be protected. A removable shield can be provided which can be selectably disposed over a portion of the mirror array to narrow the field of view in intended instances.

DESCRIPTION OF THE DRAWINGS

The invention will be more fully understood from the following detailed description taken in conjunction with the accompanying drawings in which.

DETAILED DESCRIPTION OF THE INVENTION

Figure 1:
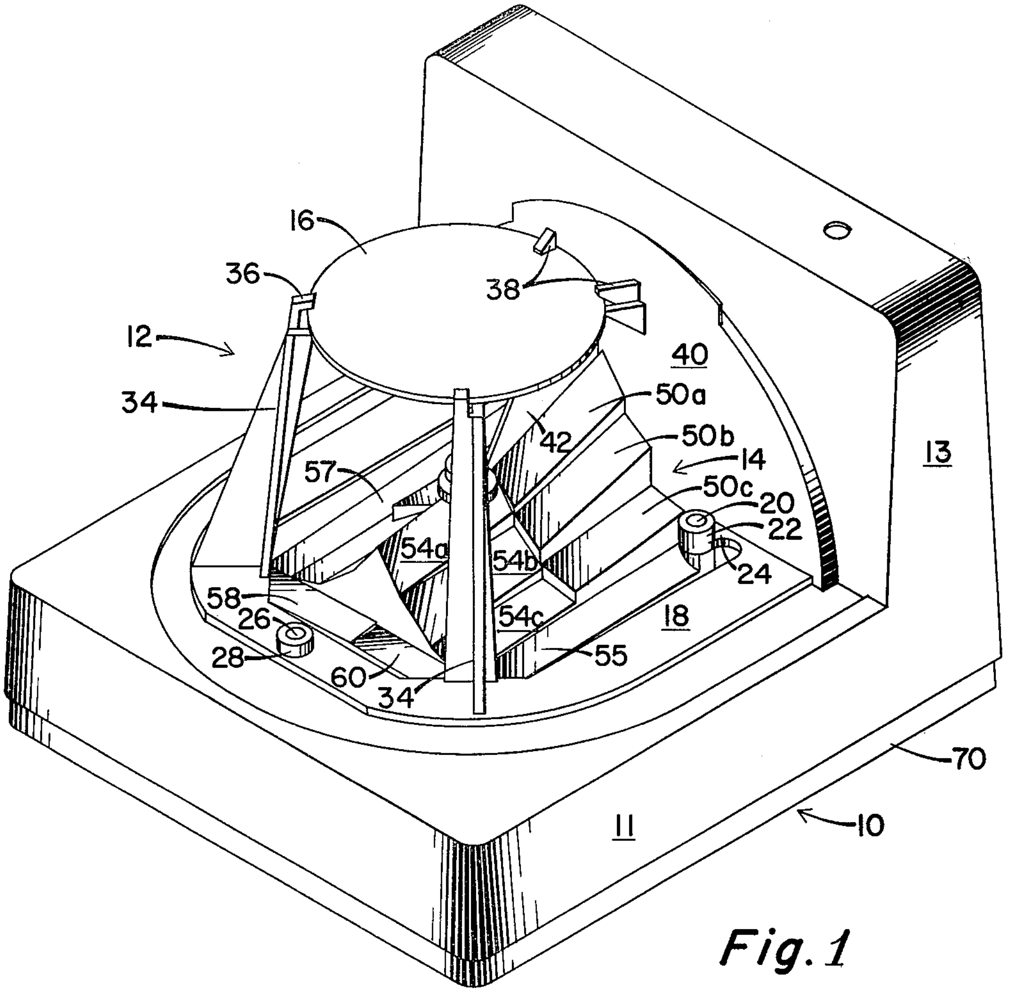
FIG. 1 is a pictorial view of the passive infrared intrusion alarm system.
Figure 2:
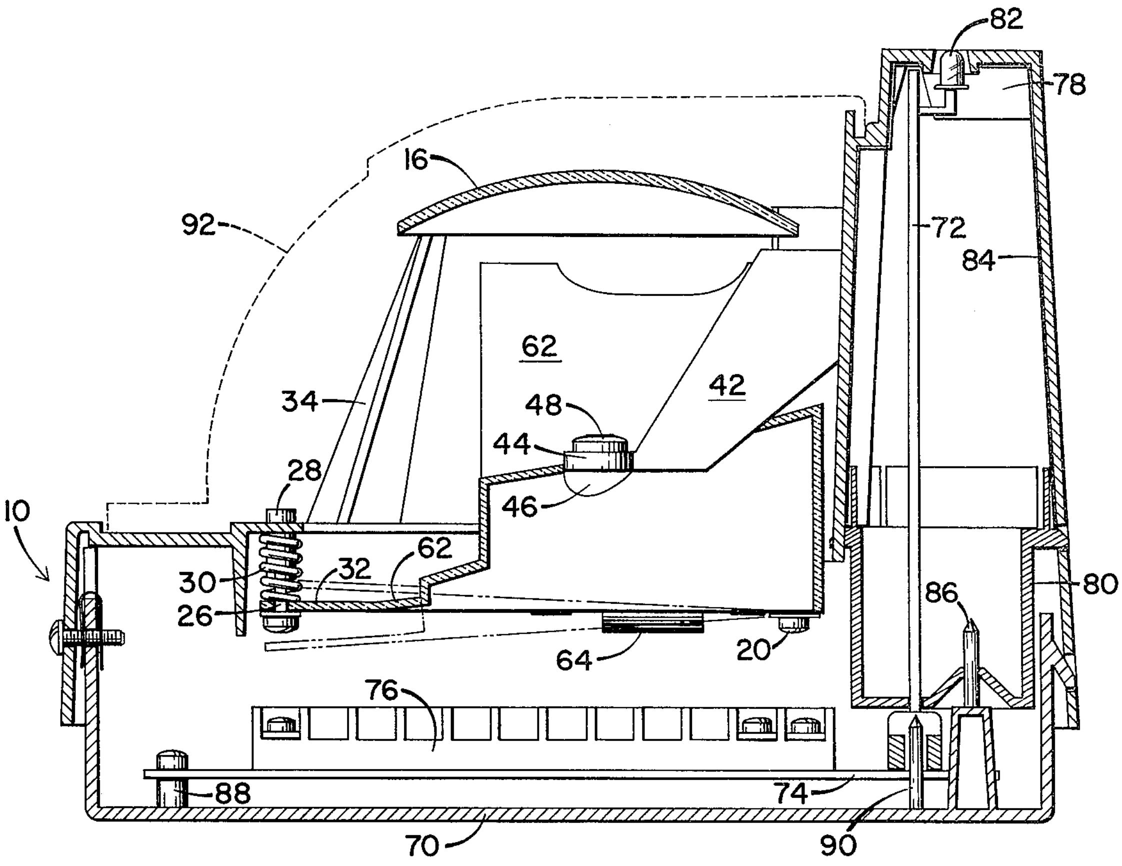
FIG. 2 is a cutaway side elevation view of the optical assembly of FIG. 1.
Figure 4:
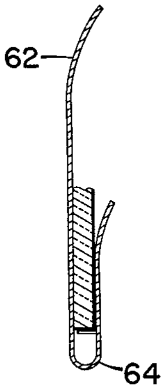
FIG. 4 is a cutaway sectional view of the clip attachment of the removable shield.

Referring to FIGS. 1 and 2 of the drawing there is shown a housing 10 which is generally of L-shaped configuration composed of portions 11 and 13, and having supported thereon a mirror assembly 12 which includes an array 14 of plane mirrors having outwardly facing mirror surfaces, and a confronting parabolic mirror 16. The plane mirror array 14 is preferably formed as a single integral unit such as by plastic molding and with the mirror surfaces provided by well known film coating techniques. The housing 10 includes a skirt portion 18 which encircles an opening in which the mirror array is disposed. The array is supported on the housing by means of a pair of threaded fasteners 20 which are disposed through openings provided in the corner portions of the array unit and threaded into collars 22 which are part of flange portions 24 of the housing 10 and which extend into the mounting opening. A third fastener 26 is disposed in an opening through an outer end of the array unit and is threaded into an associated collar 28 provided on skirt portion 18. A coil spring 30 is disposed around the fastener 26 between the collar 28 and the end portion 32 of the array unit. The spring 30 urges the array unit inward of the housing, and by adjustment of fastener 26 against the bias force of the spring 30, the array unit can be angularly adjusted, as will be further described below.

The parabolic mirror 16 is supported by a pair of struts 34 which outwardly extend from skirt portion 18 and which include end clips or retainers 36 for accommodation of the mirror 16. Retaining elements 38 are provided on housing wall 40 for retention of the mirror 16. A vane 42 outwardly extends from wall 40 and terminates at a collar portion 44 which is centrally disposed around an opening 46 in the mirror array 14 for support of an infrared detecting element 48 at the focus of the mirror 16. The vane is partially disposed in a slot 53 provided in the array unit such that the array unit can be angularly adjusted while the detecting element remains positioned at the focal plane. The electrical output of the detector element is coupled to electronic processing circuitry, to be described, to provide an output indication of intruder detection.

Figure 3:
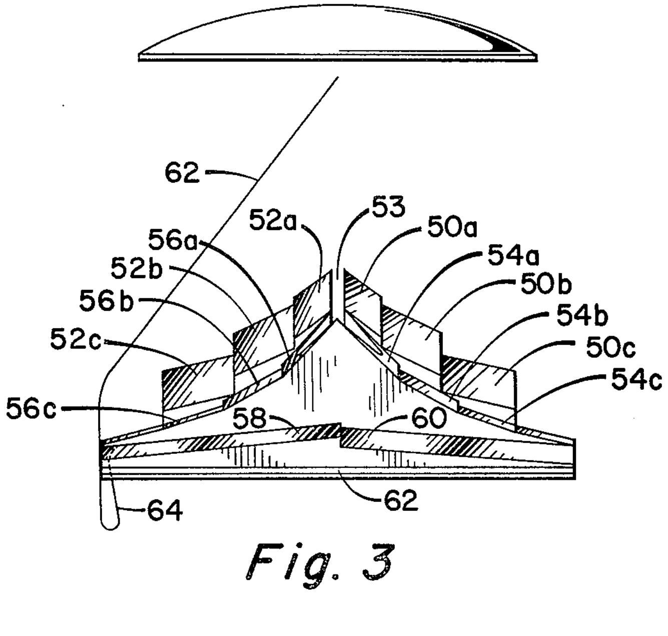
FIG. 3 is a cutaway front elevation view of the optical assembly of FIG. 1.

The mirror array 14, shown in FIGS. 1–3, comprises a first and a second group of mirrors disposed symmetrically on respective sides of a central plane which bisects the array. The first group is composed of plane mirror surfaces **50*a*, 50*b* and 50*c*, while the second group is composed of corresponding mirror surfaces 52*a*, 52*b* and 52*c*. A third and a fourth group of mirrors is symmetrically disposed about the central plane adjacent to the first and second groups. The third group includes plane mirror surfaces 54*a*, 54*b* and 54*c*, while the fourth group includes plane mirror surfaces 56*a*, 56*b* and 56*c*. A mirror surface 55 is provided at the side of the array adjacent the first and third group of mirrors. A similar mirror surface 57 is at the opposite side of the array. In each of the groups, the mirror surfaces are at different angular dispositions to provide respective fields of view. For example, the mirror surfaces 50*b* and 50*c* are at successively lesser angles to the central plane in relation to the angular disposition of surface 50*a*. Similarly, the mirror surfaces 54*b* and 54*c* are at successively lesser angles to the central plane than the surface 54*a*. In addition the mirror surfaces of each group are skewed or tilted with respect to each other along axes parallel to the central plane. A pair of plane mirror surfaces 58 and 60 are provided at the outer end of the array, these surfaces being skewed with respect to each other. A further mirror surface 62 extends adjacent to mirrors 58 and 60**.

The mirror array 14 is preferably fabricated as a single molded plastic unit having plane surfaces on which a mirrored coating is provided, and step portions joining adjacent plane surfaces. The mirror coating is typically provided by vacuum deposition of aluminum which is then coated with silicon monoxide to prevent oxidation of the aluminum. The housing 10 and the associated struts, retaining clips and detector element mounting member are also preferably fabricated as a single molded plastic unit. The struts 34 are sufficiently resilient to permit their outward flexing by an amount sufficient to install mirror 16 in place and then release the struts for retention of the mirror. The housing 10 is affixed to a base 70. A printed circuit card 72 containing the electronic signal processing circuitry is supported within housing portion 13. A further printed circuit card 74 can be supported with base 70, this card containing desired additional circuitry such as particular alarm circuits or circuits to provide an interface with associated equipment. A connector strip 76 can also be provided within the base for electrical interconnection of the system. The printed circuit card 72 is retained at one end by means of notches provided in locator plates 78 inwardly disposed at the outer end of housing portion 13.

A light emitting diode 82 or other suitable indicator is disposed within an opening provided in the housing to provide a visual walk test indication. A metallized paper, plastic or other sheet 84 is provided on the inner surfaces of housing portion 13 and joins the retaining member 80 which is preferably formed of a metallized plastic, thereby to provide a shielded enclosure for the electronic circuitry. Locator pins 86 are provided in the base 70 for ease of positioning of the housing 10. The base also includes standoff pedastals 88 for mounting of the card 74 therein, and locator pins 90 for positioning of this card and its associated connector.

An outer shell or cover 92 is affixed to the housing to enclose the mirror assembly. The cover is transmissive to infrared radiation in the spectrum of interest, and may be visually opaque to provide an unobtrusive and decorative appearance.

For use in a typical room or other facility to be protected, the housing 10 is mounted on a wall at a position to have an overall field of view which encompasses the volumetric space within which intruder presence is intended to be detected. Infrared radiation from the protected space is received by one or more of the plane mirrors of the array 14, the received radiation being reflected to the parabolic mirror 16 which is operative to focus the received radiation onto the detecting element 44 to provide an electrical output signal representative of the magnitude of received radiation. The angular orientation of the mirror surfaces of the array 14 in relation to the parabolic mirror 16 are such that radiation received by one or more of the plane mirror surfaces is reflected along an axis which is parallel to the parabolic mirror axis such that radiation will be focused onto the detecting element by the parabolic mirror.

The mirror array 14 can be angularly adjusted as a unit by rotation of fastener 26 to permit alteration of the field of view. The flange portions 24 of the housing are sufficiently resilient to permit the requisite angular movement. The spring 30 biases the array unit inward of the housing 10. The array unit is initially adjusted at a reference position which is intermediate of the upper and lower angular extremes of adjustment. Typically, the array can be altered about 4–5 degrees outward and inward to provide an angular adjustment range of about 8–10 degrees, and corresponding adjustment of the range of the field of view. The range is defined as the distance between the mirror surfaces and the floor of a facility in which the detection system is installed. The system provides a substantially 180 degree field of horizontal coverage, with seventeen fields of view provided by the respective mirrors of the array unit.

In some instances it is desirable to limit the field of view, and to accomplish this result a shield 62 is provided and which includes a clip portion 64 which can be clipped onto a side flange of array 14 to retain the shield between one half of the array unit and the parabolic reflector to effectively occlude the light path for half of the optical assembly. The shield can be disposed on either side of the array to occlude respective sides. With the shield 62 in position, radiation is either prevented by the shield from reaching the confronting plane mirror surfaces, or if radiation is received by these mirror surfaces, the shield prevents radiation reflected thereby from reaching the parabolic mirror. As a result, only the non-occluded portion of the optical assembly is effective to direct radiation from within the field of view to the detecting element.

Figure 5:
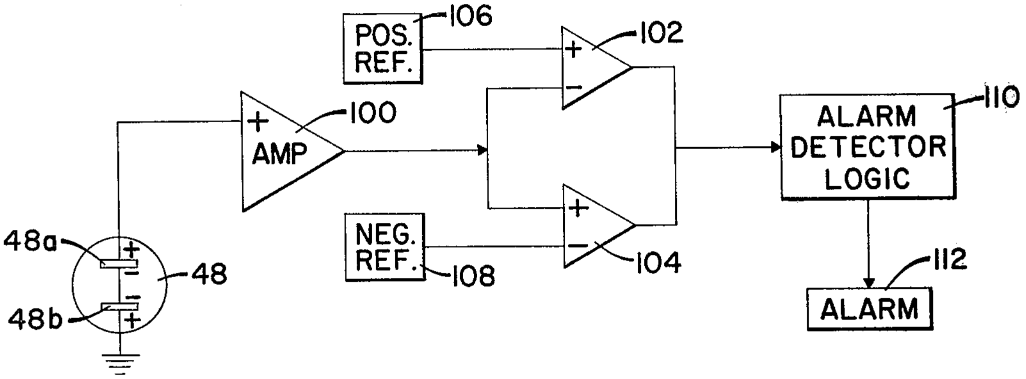
FIG. 5 is a block diagram of the electronic signal processing circuits useful in the invention.

The signal processing circuitry is shown in FIG. 5. The detecting element 48 is a dual thermopile having thermopiles **48*a* and 48*b* connected in electrical phase opposition between an AC ground and an input to a high gain bandpass amplifier 100. The amplifier includes a passband of about 0.1 to 6.0 Hz to minimize noise and spurious signals which are outside of the signal band of interest. The high frequency cut-off of the passband provides immunity from spurious signal sources to provide low noise performance. The low frequency cut-off of the passband minimizes noise due to slow background radiation changes. The output from amplifier 100 is coupled to the negative input of a comparator 102 and the positive input of a comparator 104. A positive reference source 106 provides a positive reference signal to comparator 102, while a negative reference signal is provided to comparator 104 by a negative reference source 108. The outputs from comparators 102 and 104 are applied to alarm detector logic 110 which provides a predetermined detection criteria, the satisfaction of which will produce an output signal for actuation of an alarm 112 or for application to other utilization means. The alarm detection logic 110** can be, as an example, two event logic wherein a first signal from one of the comparators causes the commencement of a time interval within which a second signal from one of the comparators must be received to trigger the alarm. An inhibit time can be provided after receipt by the alarm logic of a first signal from one of the comparators to minimize commencement of a timing cycle until after transient conditions have passed. Typically, a timing interval of about thirty seconds is provided by the two event logic, and with a two second inhibit interval after receipt of the first signal from one of the comparators.

Each thermopile of the detecting element is responsive to a respective portion of the viewing field. An intruder detected by the thermopile **48*a* causes a positive transition in signal level which will provide an output from comparator 102 if the amplified signal level exceeds the positive reference threshold. Presence of an intruder detected by the thermopile 48***b* causes a negative transition in signal level which upon exceedance of the negative reference threshold causes comparator 104 to provide an output signal.

Figure 6:
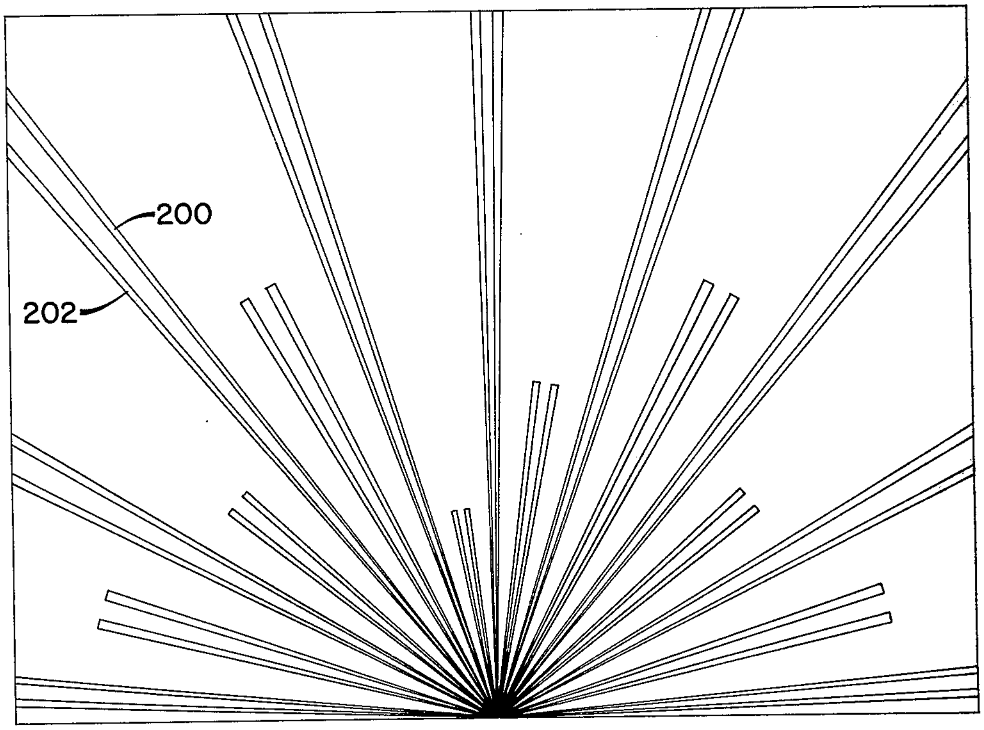
FIG. 6 is a plot of the field pattern of the system in the azimuth plane.

The field pattern of the seventeen fields of view provided by the mirror system as seen in the azimuth plane, is depicted in FIG. 6. Each field of view includes two field patterns for the respective thermopiles of the dual detecting element. The relative length of the respective field patterns illustrates the relative ranges of the different fields of view depending upon the angular orientation of the particular mirror of the array 14. The periphery of the FIG. 6 illustration represents the walls of a protected room and it is seen that those fields of view which extend to the periphery intersect the surrounding walls, while the shorter fields of view intersect the floor of the protected room. For convenience the illustrated field patterns are referred to as beams, it being understood that the term refers to a sensitivity pattern or zone of sensitivity.

In operation, assume an intruder enters a protected enclosure having the field pattern illustrated in FIG. 6. If the intruder enters beam 200, a positive signal transition will be provided by the detecting element and constitutes the first event for the two event logic. Entry of the intruder into the associated beam 202 causes a negative signal transition by the detecting element and which constitutes the second event for the two event logic which will, in consequence, provide an output signal indicating an alarm condition. The two beams of each field of view are sufficiently close in actual installation such that a person entering the protected space is likely to traverse both beams and thereby cause an alarm. Assume however that an intruder enters beam 200 and then the intruder changes direction and leaves the beam 200. The entry of the intruder into the beam will cause a first event signal, while the withdrawal of the intruder from that beam will cause a second event signal to thus case an alarm. The system is operative in response to changes or transitions in the level of received infrared radiation, and an alarm indication will be provided if the signal provided in response to detected radiation exceeds one of the bipolar reference threshold levels and meets the two event logic criteria or other detection criteria as predetermined by logic 110.

The invention is not to be limited by what has been particularly shown and described except as indicated in the appended claims.

What is claimed is:

1. An intrusion detection system comprising:

a housing adapted to be affixed to a mounting surface;

a mirror assembly on said housing including:

an array of plane mirrors having outwardly facing mirror surfaces and each providing a respective field of view for receiving infrared radiation; and a parabolic mirror having its mirror surface facing away from received infrared radiation and confronting said array of mirrors and operative to focus radiation reflected by said array of plane mirrors;

support means on said housing for support of said parabolic mirror in predetermined spaced disposition with respect to said array of mirrors;

support means on said housing for providing angularly adjustable support of said array of mirrors in relation to the parabolic mirror;

an infrared detecting element at the focus of the parabolic mirror and operative to provide electrical signals representative of received infrared radiation;

support means on said housing for support of said detecting element at the focus of the parabolic mirror; and signal processing circuitry in said housing and operative in response to the electrical signals from said detecting element to provide an output indication of intruder detection.

2. The intrusion detection system of claim 1 wherein said array of mirrors comprises:

a first and a second group of mirrors disposed symmetrically on respective sides of a central plane;

a third and a fourth group of mirrors symmetrically disposed about the central plane and adjacent to the first and second groups;

each mirror surface of each group being at a different angular disposition than adjacent mirror surfaces of that group to provide respective fields of view.

3. The intrusion detection system of claim 2 wherein said array of mirrors further includes a plurality of mirror surfaces adjacent said groups of mirrors.

4. The intrusion detection system of claim 3 wherein in each of said groups of mirrors, the mirror surfaces are at successively lesser angles to the central plane in relation to the adjacent mirror surface closer to the parabolic mirror; and wherein the mirror surfaces of each group are skewed with respect to each other along axes parallel to the central plane.

5. The intrusion detection system of claim 1 wherein said array of mirrors is fabricated as an integral unit which is adjustably mounted as a unit on said housing.

6. The intrusion detection system of claim 1 further including a shield which includes means for releasably mounting said shield in a position between a portion of said array of mirrors and said parabolic mirror to occlude a portion of the field of view.

7. The intrusion detection system of claim 2 further including a shield selectively disposable on either side of said array between one side of said array of mirrors and said parabolic mirror to occlude approximately half of the field of view.

8. The intrusion detection system of claim 5 wherein said housing includes resilient flange portions to which one end of said array is affixed and an adjustable fastener connecting the opposite end of said array to said housing and by which said array is angularly adjustable.

9. The intrusion detection system of claim 2 wherein said housing includes an opening in which said array is disposed, and resilient flange portions to which one end of said array is attached;

and wherein the adjustable support means for said array includes a threaded fastener interconnecting the end of said array opposite to the end affixed to said flanges and a confronting portion of said housing, and biasing means for urging the array inward of the housing;

whereby rotation of the fastener means causes angular movement of the array.

10. The intrusion detection system of claim 9 wherein said housing is of generally L-shaped configuration and including means in at least one of the L-shaped portions of the housing for supporting a circuit board containing the signal processing circuitry, and having an electrically shielded enclosure for the circuitry.

11. The intrusion detection system of claim 10 wherein said housing includes a cover removably affixed to the housing and enclosing the mirror assembly and being transmissive to infrared radiation in the spectrum of interest.

* * * * *